United States Patent [19]

Bashir et al.

[11] Patent Number: 4,948,545
[45] Date of Patent: Aug. 14, 1990

[54] EXTRUSION PROCESS FOR PREPARING ORIENTATED POLYOLEFINS

[75] Inventors: Zahir Bashir, Lower Clifton Hill; Andrew Keller, Westbury-on-Trym; Jeffrey A. Odell, Knowle, all of England

[73] Assignee: Stamicarbon B.V., Netherlands

[21] Appl. No.: 418,992

[22] Filed: Oct. 6, 1989

Related U.S. Application Data

[60] Continuation of Ser. No. 119,316, Nov. 9, 1987, abandoned, which is a continuation of Ser. No. 745,805, Jun. 17, 1985, abandoned, which is a division of Ser. No. 676,188, Nov. 29, 1984, abandoned.

[30] Foreign Application Priority Data

Dec. 10, 1983 [GB] United Kingdom ............... 8333032

[51] Int. Cl.$^5$ .................................................. D01F 6/04
[52] U.S. Cl. .............................. 264/210.8; 264/210.1; 264/211.12; 264/210.6
[58] Field of Search ............... 264/210.1, 210.6, 210.8, 264/211.12

[56] References Cited

U.S. PATENT DOCUMENTS 3,112,160 11/1963 Rush ................... 264/210.1
3,214,503 10/1965 Markwood, Jr. ........... 264/210.1
4,053,270 10/1977 Collier et al. ............. 425/144

FOREIGN PATENT DOCUMENTS 2330716  6/1977 France .
2385823 10/1978 France .
2056996  3/1981 United Kingdom .

OTHER PUBLICATIONS

J. A. Juijin, "Polymer Materialen Met Een Zeer Hoge Modulus"; Plastica, vol. 31, No. 9, 9/78 Rotterdam, NL, pp. 262-270.
A. S. Abhiraman, "Shish-Kebab and High Performance Morphologies"; Journal of Applied Polymer Science, vol. 23, No. 8, 4/79, N.Y., pp. 2419-2424.
Odell et al., Polymer, 1978, vol. 19, Jun., pp. 617-626.
Collier et al., Polymer Eng. & Sci. 16(3), 1976, pp. 204-211.
Smith et al., J. Mat. Sci., 15, 1980, pp. 505-514.

Primary Examiner—Hubert C. Lorin
Attorney, Agent, or Firm—Brooks Haidt Haffner & Delahunty

[57] ABSTRACT

An orientated polyolefin composition comprising an olefin (co)polymer having a weight average molecular weight (Mw) from 30,000 to 1,000,000 and a high molecular weight tail extending to molelcular weights above 1,000,000, and has a microstructure which is substantially parallel chain extended cores of the component polymer(s) and associated lamellar overgrowths extending in planes normal to the cores in which the lamellar overgrowths on adjacent cores intermesh and are capable of sustaining a haul off tension of at least 10 MPa without breaking during its extrusion, is produced by extruding an olefin copolymer through a die under a pressure of about 5-10 MPa, at a temperature above the self-blocking temperature thereof and by hauling off the extrudate at a tension of at least 10 MPa without breaking. The extrudates so produced have a high modulus.

11 Claims, 1 Drawing Sheet

EXTRUSION PROCESS FOR PREPARING ORIENTATED POLYOLEFINS

This application is a continuation of application Ser. No. 07/119,316, filed Nov. 9, 1987, now abandoned, which is a continuation of application Ser. No. 06/745,805, filed June 17, 1985, now abandoned, which is a divisional of application Ser. No. 06/676,188, filed Nov. 29, 1984, now abandoned.

The present invention relates to novel orientated polyolefins and to a continuous extrusion process for the production thereof.

It is known from Odell, J.A., et al in Polymer, Vol 19, p 617, (1978) that orientated polyethylene plugs can be produced by extruding polyethylene through a capillary die under conditions of pressure and temperature such that fine "fibrils" are produced within the melt in the capillary, and then blocking the die exit so that the pressure within the capillary rises and causes the melt to rapidly solidify therein. The die is then cooled and the polyethylene plug is removed from the capillary. The orientated plugs so produced have a high modulus ranging from 10–100 GPa and are less prone to fibrillation and thermal shrinkage normally associated with other forms of orientated polyethylene produced, for example, by cold drawing.

Electron microscopy of the plugs revealed an almost entirely lamellar microstructure with the lamellae extending in planes normal to a system of substantially parallel chain extended cores, the cores being orientated in a direction substantially parallel to the longitudinal axes of the plugs. Each chain extended core and its associated lamellae which are believed to be chain-folded overgrowths of the core had an overall shape not unlike a microscopic "shish-kebab". It was further observed that the lamellae associated with adjacent cores intermeshed with one another and this was considered to be a primary reason for the observed high modulus of the plugs. This die-blocking technique is only applicable to the discontinuous production of short plugs.

It is an object of the present invention to provide novel orientated polyolefins having "shish-kebab" orientated microstructure and to provide a continuous process for the production thereof.

Accordingly, the present invention is an orientated polyolefin composition comprising an olefin (co)polymer having a weight average molecular weight (Mw) above 30,000 and not greater than 1,000,000 and a high molecular weight tail extending to molecular weights greater than 1,000,000, the composition having a microstructure which comprises substantially parallel chain extended cores of the component polymer(s) and associated lamellar overgrowths extending in planes normal to the cores and in which the lamellar overgrowths on adjacent cores intermesh and being capable of sustaining a haul off tension of at least 10 MPa at a temperature up to 5° C. above the self blocking temperature of the olefin (co)polymer without breaking during extrusion thereof.

By "olefin (co)polymer" is meant throughout this specification one or more olefin homo-polymers, co-polymers or melt blends of two or more (co)polymers which either inherently or as a consequence of melt blending has the defined haul off tension, molecular weight and molecular weight distribution characteristics. References herein to 'melt blends' exclude solution blending because such solution blends need large amounts of solvents which create considerable handling, recovery and polymer contamination problems.

The molecular weight distribution of the olefin (co)polymers referred to herein are determined by gel permeation chromatography (GPC) under the following conditions:

| | |
|---|---|
| Temperature | 140° C. |
| Mobile Phase | Trichlorobenzene (TCB) |
| Flow Rate | 0.5 ml/min |
| Injection Volume | 500 microliters |
| Concentration C (% wt) | Adjusted so that in the intrinsic viscosity (deciliter/g) as determined in trichlorobenzene at 140° C. is 0.15. |
| Detector | Differential Refractive Index |
| Pressure | 9 bar |
| Columns | Shodex A806/S A80M/S A804/S |
| Calibration | NBS SRM 1475 Narrow MWD polyethylenes (PE) Linear hydrocarbons Narrow MWD polystyrene (PS) + universal calibration (K (PS) = 1.21 × 10$^{-4}$, alpha (PS) = 0.707 K (PE) = 4.48 × 10$^{-4}$, alpha (PE) = 0.718 |

The defined microstructure of the composition of the present invention is hereafter termed as 'shish-kebab' morphology.

In the composition of the present invention the distance between the adjacent cores is suitably less than 5000 Angstroms, and is preferably below 2000 Angstroms and most preferably from 500–2000 Angstroms. The lamellae associated with adjacent cores preferably taper in thickness from the core outwards and intermesh thereby forming a "zip-like" structure. If the cores are too far apart disorientation can occur due to lamellar twisting which adversely affects the physical properties of the composition.

The olefin (co)polymer to be extruded has a density which is at least 910 kg/m$^3$, suitably above 920 and preferably from 925 to 960 kg/m$^3$ as determined by British Standard BS 2782-620D. The density of the olefin (co)polymer should be such that it is able to crystallize from a melt thereof.

The present invention further provides a continuous process for producing an extruded polyolefin composition which comprises an olefin (co)polymer which has a weight average molecular weight (Mw) above 30,000 and not greater than 1,000,000 and a high molecular weight tail extending to molecular weights greater than 1,000,000, said process comprising continuously extruding the polyolefin under pressure at a temperature above its self-blocking temperature through a die, cooling the extrudate at the die exit and continuously hauling off the extrudate at a tension of at least 10 MPa without breaking so as to avoid die swell.

The olefin (co)polymer is suitably polyethylene having a weight average molecular weight (Mw) from 30,000 to 1,000,000, preferably not greater than 800,000 and a high molecular weight tail. Further the molecular weight distribution of the polymer should have a high molecular weight 'tail' component but preferably should not have a corresponding 'tail' component at the low molecular weight end of the distribution curve. The molecular weight of the high molecular weight 'tail' component is preferably from 1,000,000–5,000,000 and that of the low molecular weight 'tail' component, which should preferably be absent, ranges, if present from 500–10,000. An example of a suitable olefin polymer is an unblended polyethylene having a weight average molecular weight (Mw)=400,000 and a number average molecular weight (Mn) =73,000 of which 9% w/w has a molecular weight above 1,000,000 but which has no low molecular weight tail below 2000. The high molecular weight tail component is responsible for the formation of the core fibrils which are the chain extended nuclei and which promote formation of the shish-kebab morphology. On the other hand, presence of a low molecular weight tail is detrimental to such morphology because it tends to reduce melt strength thereby preventing the use of relatively high haul-off stresses during extrusion.

The relative concentration of the high molecular weight tail component in the olefin (co)polymer is suitably below 20% w/w, preferably below 10% w/w. Within the ranges of concentration specified above it is preferred that the higher the average molecular weight of the polyolefin in the tail (i.e. above 1,000,000), the lower its concentration in the olefin (co)polymer. Preferably the olefin (co)polymer contains at least 0.5% w/w of high molecular weight tail component.

The polyolefin composition should be capable of sustaining a haul-off tension of at least 10 MPa, preferably greater than 50 MPa, most preferably from 50–75 MPa without breaking during extrusion.

The extruded product in its fibrous form suitably has a modulus of at least 3 GPa, preferably greater than 5 GPa.

The polyolefin composition may also contain small quantities of an antioxidant or other conventional additives, for example to prevent oxidation of the olefin (co)polymer during storage or use which may affect its molecular weight and hence the physical properties thereof.

An olefin (co)polymer which inherently possess the desired haul off tension, weight average molecular weight, and the stated requirements of the high and low molecular weight tail components is suitably an unblended homo- or copolymer as obtained from a polymerization reactor. Such an unblended polyolefin can be prepared, for example, by a Ziegler or a Phillips process using appropriate catalysts and polymerization conditions known in the art.

The olefin (co)polymer is preferably dried prior to extrusion.

During the extrusion it is necessary to maintain the olefin (co)polymer in the die just above but not more than 7° C. above its self-blocking temperature which is the temperature at which the melt of the olefin (co)polymer solidifies in the die and stops extruding. The extrusion temperature may for example be maintained at not more than 5° C., for example not more than 2° C., above the self-blocking temperature. The precise value of the self-blocking temperature will depend upon various extrusion conditions such as the extrusion rate, die geometry and the composition of the olefin (co)polymer. However, in all cases the self-blocking temperature is higher than the melting temperature of the olefin (co)polymer at normal (1 atmosphere) pressure due to the fact that increased pressure raises the melting temperature. The self-blocking temperature of a given melt can be determined by simple trial and error techniques known to those skilled in the art. The extrusion pressures used in the present invention can be relatively low e.g. 5–10 MPa in comparison with conventional solid state extrusion processes which use pressures of around 200 MPa.

The extrudate, as it emerges from the die exit, is cooled to ambient temperature. In some cases it may be necessary to quench the extrudate as it leaves the die exit so as to crystallize the sample before the oriented structures relax. As a qualitative guide, the extrudate retains its transparency when the sample is crystallized. The extrudate may be cooled using liquid or gaseous coolant but it is necessary to ensure that the die itself is not cooled.

The extrudate, if it is in the filament or fiber form, is preferably wound on a mandrel which may also be cooled. The speed of winding of the extrudate is so controlled that the extrudate is held taut and hauled off so as to avoid any die swell as the extrudate emerges from the die. Preferably the haul-off speed is such that the extrudate has a diameter which is substantially the same as or less than that of the die.

The extrudate derived from the olefin (co)polymer by the present invention has higher modulus compared with extrudates derived from olefin polymers which do not have the defined average molecular weight and molecular weight distribution characteristics and which are extruded at temperatures very much above the self blocking temperature of the polymer with little haul-off stresses during wind up. The relevant data in this context are described below with reference to the Examples and Comparative tests.

The present invention will now be further illustrated by reference to the following drawings which are not to be deemed limitative of the present invention in any manner thereof.

EXAMPLES

Materials used (a) A conventional polyethylene, Rigidex 006-60 (Regd. Trade Mark, polyethylene Mw=130,000 and a number average molecular weight, Mn=19,200) and (b) an unblended polyethylene (Mw=400,000, and a number average molecular weight, Mn=73,000) with a high molecular weight tail component of which 9% w/w had a molecular weight greater than 1,000,000 and which had 0% component of molecular weight less than 2000.

EXAMPLE AND COMPARATIVE TESTS

Continuous Extrusion of an Orientated Extrudate from (a) Rigidex 006-60 and (b) unblended Polyethylene with a High Molecular Weight Tail The preparation of extrudates from both Rigidex 006-60 alone and polyethylene with a high molecular weight tail is described below:

The Method of Extrusion

Figure 1:
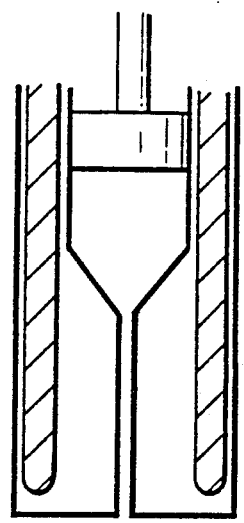
FIG. 1 shows a device for continuously extruding the polyolefin melt.

The polyolefin melt was extruded through the Instron capillary rheometer with a die, 0.85 mm in diameter and 10 mm long as represented in FIG. 1. The extrudate was passed over a pulley and then wound up on a motor driven drum. The extrudate was quenched by cold air from a pipette directed about 20 mm from the die exit. The extrusion conditions are shown in Table 1.

For comparison, conventional Rigidex 006-60 which does not have the stated high and low molecular weight tail characteristics was extruded at just above the self-blocking temperature (see Table 1) at a melt speed of $2 \times 10^{-3}$ m/s. There was maximum die swell just before self-blocking and chain extended fibrils were present; if the die was blocked with a needle valve shish kebabs were retained in the plug in the capillary. However, when an attempt was made to pull the extrudate in order to spool it on the wind-up system, it would not draw or sustain a tension, highlighting the difficulties of extruding conventional molecular weight distribution polymers near the self-blocking temperature (138° C). When the temperature was raised to 150° C. (Table 1) and the melt extruded, there was less die swell and it was possible to pull the melt, spool it and wind it up. If the drum take up speed was increased above the melt exit velocity, the extrudate drew down to a diameter smaller than the die diameter. High haul-off stresses were not obtained during wind-up of the extrudate. The extrudate was white, had little orientation and had low modulus (Table 2).

In contrast to the above, there was a marked difference in the extrusion behavior of the unblended polyethylene which had a high molecular weight tail in accordance with the present invention. Once again, there was maximum die swell just above self-blocking temperature and due to the increase in viscosity, the self-blocking temperature was much higher for the same extrusion rate compared to Rigidex 006-60 alone. The most important difference was that whereas Rigidex 006-60 melt could not be pulled without breaking if extruded just above the self-blocking temperature, the unblended polyethylene which had a high molecular weight tail sustained a tension of 50 MPa and could be pulled and wound up. As the drum take up speed was increased the die swell was lost and the extrudate thinned down to approximately the die diameter. At this stage the extrudate was translucent. Applying a stream of cold air to the taut extrudate as it wound up, through a pipette, about 20 mm below the die exit, caused the extrudate to become transparent. The extrudate so produced had a high degree of transparency and orientation.

The unblended polyethylene (b) was extruded as follows: the extrusion was started at about 7–10° C. above the self blocking temperature to avoid die blockage problems. An extrusion rate was chosen so that a smooth and uniform extrudate was obtained. The extrudate was wound up continuously. At this initial stage, the extrudate had little orientation, was opaque or translucent, and the haul off stress was low. The temperature of the extruder was then allowed to drop to the self blocking temperature, while extrusion and wind up was allowed to continue. As the critical temperature was reached, the extrudate became transparent and the haul off stress increased dramatically, attaining values as high as 50 MPa or more. If the temperature was allowed to drop any further, the extrudate broke (thus, the self blocking temperature may be regarded as that at which the highest sustainable haul off stress is obtained without the extrudate breaking).

Figure 2:
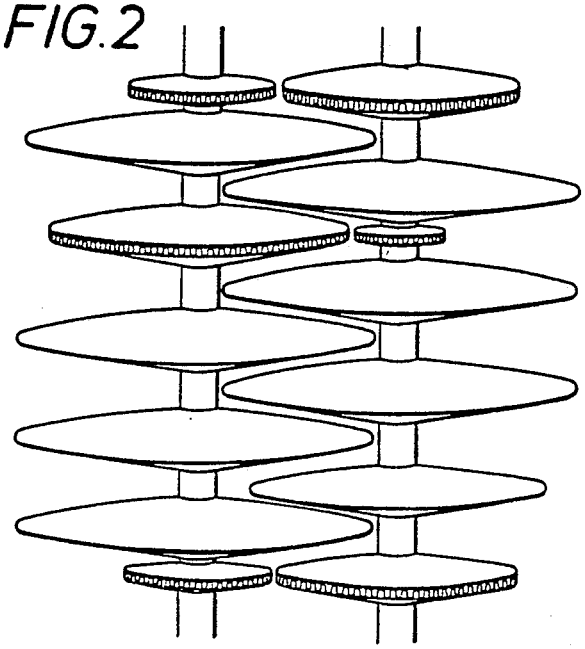
FIG. 2 shows the microstructure of the extrudate produced according to the invention.

The electron micrograph of the extrudate produced from the unblended polyethylene which had a high molecular weight tail clearly indicated the presence of shish kebabs diagrammatically shown in FIG. 2. Again intermeshing of lamellae had occurred when the cores were sufficiently close and there were areas of disorientation where the cores were far apart. This structure is different from the morphology of "as spun" Rigidex 006-60 alone, where no shish-kebabs were present.

The melting behavior of the extrudates from Rigidex 006-60 alone and the unblended polyethylene which had a high molecular weight tail were studied with a differential scanning calorimeter (DSC, IIB, Perkin and Elmer). The relevant traces showed that there is only one broad melting peak, similar to the one observed with pellets of spherulitic Rigidex 006-60. However, after extruding the unblended polyethylene which had a high molecular weight tail into an oriented extrudate, the melting behavior invariably showed two peaks (and in some cases three peaks) consisting of one main peak at ca 132° C. formed from the melting of the lamellae and a subsidiary peak at a higher temperature (at ca 142° C.) attributable to the melting of the cores. If the sample was cooled after heating to 180° C. and remelted only one broad peak was obtained; clearly the shish-kebab morphology was largely lost during recrystallization after heating above 160° C.

Thus a two melting peak behavior with a separation of about 10° C. between peaks appears to be associated with a shish-kebab morphology, as shown by the extrudates made continuously from the unblended polyethylene which had a high molecular weight tail.

The mechanical properties of the extrudate shown in Table 2 also show that the unoriented Rigidex 006-60 extrudate has tensile modulus of 0.5–0.7 GPa. The extrudates from unblended polyethylene which had a high molecular weight tail had moduli of up to 10 GPa. Thus, the extrudate from the unblended polyethylene is stiffer than an extrudate of ordinary Rigidex by a factor 10–20, but lower by a factor of 5 compared to the extensional moduli of the oriented plugs.

TABLE 1

| Polymer | Extrusion Conditions | | | | Comments |
|---|---|---|---|---|---|
| | Self blocking Temperature | Extrusion Temperature | Melt Extrusion Speed | Wind Up Speed | |
| Rigidex* 006-60 | 138° C. | 139° C. | $2 \times 10^{-3}$ m/s | — | Melt failure. |
| " | 138° C. | 150° C. | " | much greater than $2 \times 10^{-3}$ m/s | Melt draws down; extrudate diameter less than die diameter. Extrudate has little orientation. |
| Polyethylene (b) with a high molecular weight tail | 142° C. | 147° C. | " | about $2 \times 10^{-3}$ m/s | There is higher tension on extrusion line. Very stable extrusion possible. |
| Polyethylene (b) with a high molecular weight | 142° C. | 143° C. | " | about $2 \times 10^{-3}$ m/s | There is higher tension on extrusion line. Very stable extrusion possible. |

TABLE 1-continued

| | | Extrusion Conditions | | | |
|---|---|---|---|---|---|
| Polymer | Self blocking Temperature | Extrusion Temperature | Melt Extrusion Speed | Wind Up Speed | Comments |
| tail | | | | | |

*Regd. Trade Mark.

TABLE 2

Extensional Moduli of Polyethylene Extrudates
The sample gauge length was 100 mm and
the cross-head speed (Instron) was 2 mm/min.

| Polymer | Extensional modulus | Comments |
|---|---|---|
| Rigidex* 006–60 | 0.7 GPa | Extruded at 150° C. See Table 1. |
| Polyethylene (b) with a high molecular weight tail | 4.5 GPa | Extruded at 147° C. See Table 1. |
| " | 10 GPa | Extruded at 143° C. See Table 1. |

*Regd. Trade Mark.

We claim:

1. In an extrusion process for preparing a polyolefin composition having an orientated microstructure which comprises substantially parallel chain extended cores of the component polymer(s) and associated lamellar overgrowths extending in planes normal to the cores and in which the lamellar overgrowths on adjacent cores intermesh, the improvement comprising:
   (a) using as starting material a polyolefin comprising an olefin (co)polymer having a weight average molecular weight (Mw) above 30,000 and not greater 1,000,000 and a high molecular weight tail extending to molecular weights greater than 1,000,000;
   (b) performing the extrusion through a die under pressure and at a temperature above, but not more than 5° C. above, the self blocking temperature;
   (c) cooling the extrudate at the die exit while maintaining the die temperature conditions set forth in (b) above; and
   (d) continuously hauling off the extrudate at a haul-off stress of at least 10 MPa so as to avoid die swell.

2. A process according to claim 1 wherein the extrusion takes place at a temperature not more than 2° C. above the self blocking temperature.

3. A process according to claim 1 wherein the olefin (co) polymer starting material has a low molecular weight tail in the range of 500 to 10,000.

4. A process according to claim 1, wherein the olefin (co)polymer starting material includes substantially no molecular weight tail below a molecular weight of 500.

5. A process according to claim 1, wherein the olefin (co)polymer starting material contains at least 0.5% w/w of high molecular weight tail component.

6. A process according to claim 1 wherein the olefin (co)polymer is dried prior to extrusion.

7. A process according to claim 1 or 6 wherein the extruded product is a fiber and has a modulus of at least 3 GPa.

8. A process according to claim 1, wherein the olefin (co)polymer starting material is polyethylene having a weight average molecular weight (Mw) from 30,000 to 1,000,000 and the molecular weight of the high molecular weight tail component in the (co)polymer is from 1,000,000 to 5,000,000.

9. A process according to claim 1 wherein the olefin (co)polymer starting material is an unblended homo - or (co)polymer as obtained from a polymerization reactor.

10. A process according to claim 1, wherein the olefin (co)polymer starting material has a density which is at least 910 kg/m$^3$.

11. A process according to claim 1 wherein the distance between adjacent cores in the extruded composition is less than 5000 angstroms.

* * * * *